United States Patent [19]

Ziegler et al.

[11] Patent Number: 4,874,252
[45] Date of Patent: Oct. 17, 1989

[54] ELECTRONIC THERMOMETER

[75] Inventors: Horst Ziegler, Paderborn; Horst Behlen, Paderborn-Dahl, both of Fed. Rep. of Germany

[73] Assignee: W. C. Heraeus GmbH, Hanau, Fed. Rep. of Germany

[21] Appl. No.: 262,512

[22] Filed: Oct. 25, 1988

[30] Foreign Application Priority Data

Dec. 24, 1987 [DE] Fed. Rep. of Germany ....... 3744196

[51] Int. Cl.⁴ ..................... G01K 11/26; G01K 7/32
[52] U.S. Cl. ................................. 374/117; 374/184; 331/66; 331/68; 336/DIG. 2
[58] Field of Search ............... 374/117, 163, 176, 177, 374/184; 331/66, 68; 73/579, 658; 336/DIG. 2

[56] References Cited

U.S. PATENT DOCUMENTS

| | | | |
|---|---|---|---|
| 3,303,701 | 2/1967 | Matsuura et al. | 374/184 |
| 3,338,100 | 8/1967 | Takami | 374/184 |
| 3,391,576 | 7/1968 | Takami et al. | 374/184 |
| 3,421,374 | 1/1969 | Wieting et al. | 374/184 |
| 3,452,597 | 7/1969 | Grady, Jr. | 374/117 |
| 3,519,924 | 7/1970 | Burton | 374/117 |
| 3,917,970 | 11/1975 | Sidor et al. | 374/176 |
| 4,377,733 | 3/1983 | Yamaguchi et al. | 374/117 |

FOREIGN PATENT DOCUMENTS 0041168  12/1981  European Pat. Off. .
3318158  12/1983  Fed. Rep. of Germany .

Primary Examiner—William A. Cuchlinski, Jr.
Assistant Examiner—Diego F. F. Gutierrez
Attorney, Agent, or Firm—Frishauf, Holtz, Goodman & Woodward

[57] ABSTRACT

An electronic thermometer has an oscillator, the frequency determining element of which is a temperature sensitive piezoelectric element (2), used as a measuring sensor, which is located inside a sealed housing (3). The piezoelectric element is provided with two termial electrodes (4, 5) which are galvanically separated from the oscillator circuit bia an inductively coupled pair of coils (6, 7); the coil (6) connected to the terminal electrodes is tightly encompassed by the housing. An evaluation unit (10) for detecting the temperature is connected to the oscillator circuit.

12 Claims, 4 Drawing Sheets

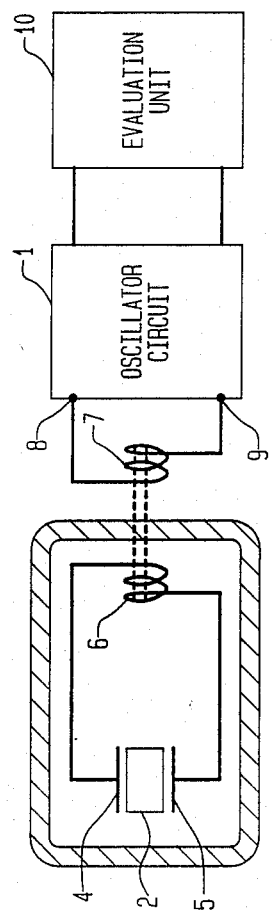

ELECTRONIC THERMOMETER

Cross-reference to related co-pending applications, the disclosures of which are hereby incorporated by reference, assigned to the assignee of the present application:

METHOD AND SYSTEM TO TRANSMIT SIGNALS BEING GENERATED BY A MEASURING SENSOR, AND SPECIFICALLY A TEMPERATURE SENSOR, Ser. No. 102,111, ZIEGLER et al., filed Sept. 29, 1987, claiming priority of German application P 36 33 939.3, filed Oct. 4, 1986.

SYSTEM FOR REMOTE SENSING OF A PHYSICAL PARAMETER, Ser. No. 143,567, ZIEGLER et al., filed Jan. 13, 1988, claiming priority of German application P 37 01 082.4, filed Jan. 16, 1987.

PULSE-GENERATING SENSOR UNIT FOR REMOTE SENSING SYSTEM, Ser. No. 172,702, ZIEGLER, filed Mar. 23, 1988, claiming priority of German application P 37 13 956.8, filed Apr. 25, 1987.

ELECTRONIC THERMOMETER, Ser. No. 262,513, ZIEGLER & BEHLEN, filed Oct. 25, 1988, claiming priority of German application P 37 44 239.2, filed Dec. 24, 1987.

The invention relates generally to electronic thermometers and more particularly to an electronic thermometer having an oscillator, the frequency-determining element of which is a temperature-sensitive piezoelectric element used as a measuring sensor having two connecting electrodes; the electrical circuit of the connecting electrodes has a galvanic separation from the oscillator circuit, and an evaluation unit is connected to the oscillator circuit, for ascertaining the temperature.

BACKGROUND

From European Patent No. 41 168, a temperature measuring sensor is known, having a quartz oscillator as its temperature-sensitive element, which is accommodated in a sealed metal housing, which has helium, for example, as a filling gas. The electrical line ducts leading through the housing wall are sealed off by the glass sleeves that surround them and are electrically insulated from the housing wall.

In practice, the dissimilar thermal expansion coefficients and heat-sensitive insulating materials make such seals problematic, especially at higher temperatures, so the line ducts limit the upper temperature measuring range of such temperature measuring sensors; also, such ducts are relatively expensive to produce.

One option for transmitting signals without a galvanic connection is known from German Patent Disclosure Document DE-OS No. 33 18 538, which describes a signal transmission by means of an inductive coupling of two coils, The differentiating effect of the coils is utilized for transmitting the edges of a digital signal. This patent disclosure document relates expressly to the weak coupling of a stray field, so that it is unsuitable for use in oscillators, which require the best possible coupling.

THE INVENTION

It is the object of the invention to provide a hermetically sealed enclosure of the temperature-sensitive piezoelectric element for protecting it against aging due to external factors, which enables both relatively simple manufacture and an increase in the upper temperature limit to a range from 350° to 400° C.

In a preferred embodiment, the piezoelectric element is enclosed by a housing of quartz glass. However, the outer coil can also be movable, so that for test purposes, for example, it can be inductively coupled successively with a great number of inner coils. A temperature-sensitive quartz oscillator having an inherent mechanical resonance frequency is preferably used as the piezoelectric element.

One advantage of the arrangement according to the invention is the opportunity for optimization by adapting the number of windings of the two coils to one another; as a result, the high-frequency (HF) impedance of the quartz can be adapted to the HF impedance of the oscillator circuit.

The opportunity of disposing the hermetically sealed temperature-sensitive piezoelectric in aggressive media, such as electrolytes in electrolysis systems, proves to be particularly advantageous; the electronically sensitive parts of the oscillator circuit are located outside the electrolyte. Another advantage is that the piezoelectric element can be disposed on the rotor of rotating shafts, in order to measure the winding temperature in electric machines, or for measurement in the plane of the sample in rotating weather-testing equipment; by inductive coupling in the axial direction between the inner coil, located in the rotating housing, and the stationary outer coil, transmission of the frequency signal does not require a conductive connection via slip rings or some kind of radio connection. It provides to be particularly advantageous that besides the piezoelectric element, no electronic components whatever, with their limited temperature range, are located in the rotating part; by comparison, this advantage does not exist, for example, in cases where external auxiliary energy is supplied to the rotating part optically or inductively.

DRAWINGS

FIG. 1 is a schematic cross section taken through a housing encompassing the piezoelectric element;

DETAILED DESCRIPTION

Figure 2A:
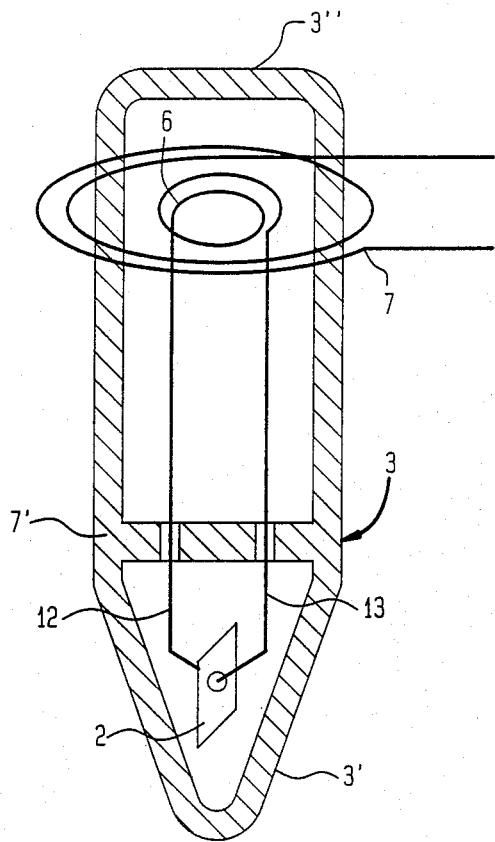
FIGS. 2a, 2b show an arrangement having a cylindrically symmetrical housing.

In FIG. 1, the schematically shown piezoelectric element 2 is located in a housing 3 of diamagnetic or paramagnetic material, so that no magnetic shielding takes place. Ceramic, glass and quartz glass materials have proved particularly advantageous, because they have high temperature resistance. The inner coil 6, connected to both terminal electrodes 4, 5 of the piezoelectric element 2, is applied over a relatively large surface area to the inside of the housing 3; the winding extends in a spiral about the coil axis. An inductive coupling exists between the inner coil 6 and an outer coil 7. The coil 7 is connected via the terminals 8, 9 to the oscillator circuit 1, which in order to detect the temperature is connected to an evaluation unit 10.

Because of the hermetically sealed encapsulation, it is possible to use the piezoelectric element as a measuring sensor in an aggressive environment, for example in electrolysis cells. Temperature detection then takes place inductively through the housing wall.

FIG. 2a shows an arrangement in which the housing 3 encompassing the piezoelectric element 2 has a tubular shape, in the manner of a mercury fever thermometer, with the element 2 accommodated in the measurement tip 3' of the housing 3. In the end 3" remote from the measuring tip, a spiral coil 6 connected to the terminal electrodes of the element 2 is provided, which in turn is coupled inductively to an outer coil 7 that can be slipped over the end 3". The coil 7 may for example lead via a line to a stationary apparatus in which the oscillator circuit and the evaluation unit are located. Such an arrangement is useful particularly in the medical field, because after the detachable coil 7 is removed, the housing 3 can undergo a sterilization process. The sterilization process is unproblematic for the components in the housing 3, because the piezoelectric element and the coil have sufficient heat resistance for steam sterilization, while the heat-sensitive components, such as semiconductors and the current supply, are located outside the housing.

However, this arrangement is also suitable for temperature measurement in aggressive media, in which case the measuring tip 3' need merely be dipped into them.

Figure 2B:
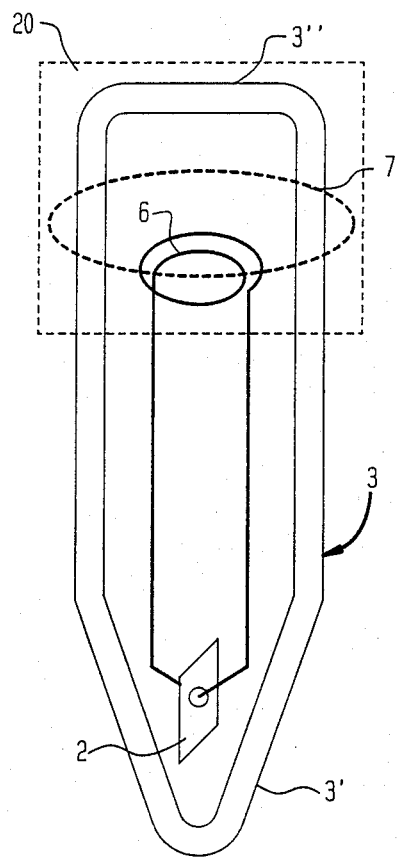

A variant of the arrangement shown in FIG. 2a is shown in FIG. 2b; in FIG. 2b, a complete unit 20 including the oscillator circuit and evaluation unit is slipped together with the outer coil onto the end 3" of the housing, and the complete unit can be removed for sterilization of the housing 3.

The embodiment shown in FIG. 2a is also suitable in a measuring apparatus having a rotating shaft; the housing 3 is located for instance on the end of a shaft, and an inductive coupling in the axial direction takes place between the inner coil 6, located in the housing 3, and a stationary outer coil 7; that is, coupling in the direction of the axis of rotation of the shaft takes place. The outer coil 7 has a permanent magnet core 7' and is connected to the oscillator circuit and evaluation unit.

However, instead of the permanent magnet, it is also possible to use an electromagnet, which can be supplied with an additive direct current in the coupling coil.

The arrangement shown in FIG. 2a is also suitable for use of the measuring sensor on the rotating sample holder of a weather-testing apparatus, the outer coil annularly surrounding the entire sample holder and the inductive coupling taking place in the direction of the axis of rotation of the sample holder.

Figure 3:
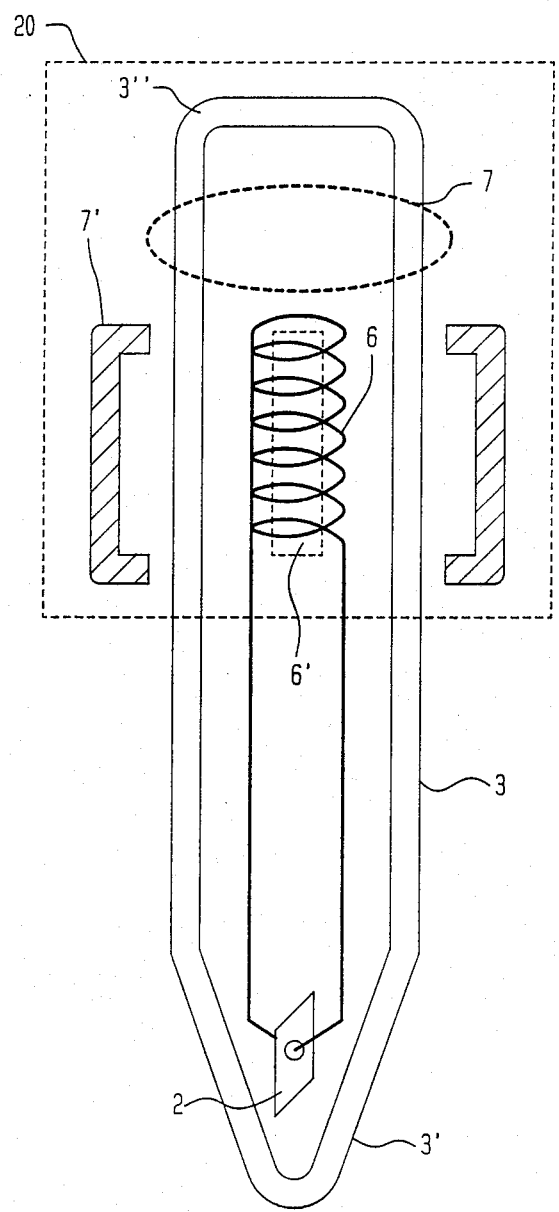
FIG. 3 shows a possible holder for a cylindrically symmetrical housing.

FIG. 3 shows an inner coil 6, encompassing a ferrite core 6', in the housing 3, which is surrounded at its end 3" by a permanent magnet 7' or an electromagnet, which serve to center a detachable unit 20 of the kind shown in FIG. 2b.

This arrangement is again suitable for use in a rotatable housing 3; the detachable unit 20 is attached in a stationary manner.

Preferably, enclosed coil 6 is attached over a relatively large surface area on the inside of housing 3, and the magnetic field lines extend at right angles to the housing wall and enter coil 7 outside housing 3.

Various changes and modifications may be made, and features described in connection with any one of the embodiments may be used with any of the others, within the scope of the inventive concept.

We claim:

1. An electronic thermometer having
   a generally cylindrical rotatable sealed housing (3) of electrically insulating material; an oscillator comprising
   a temperature-sensitive piezoelectric element (2) with a mechanical resonance frequency which is temperature-dependent, located inside said housing (3), said element including a pair of terminals (4,5);
   an oscillator circuit (1), having a pair of oscillator input terminals (8, 9) galvanically separated from said rotatable housing and piezoelectric element, and an output;
   evaluation unit means (10) for detecting temperature, connected to said oscillator output;
   a first coil (6) located adjacent an outer wall of said rotatable housing (3) and connected across said piezoelectric element terminals (4, 5), and
   a second coil (7) separated from said rotatable housing (3), but aligned with said first coil (6), and connected across said oscillator input terminals (8,9),
   said coils (6, 7) transmitting a temperature-dependent signal from said piezoelectric element (2) to said oscillator circuit (1), thus directly specifying the oscillation frequency thereof, while providing said galvanic separation therebetween.

2. An electronic thermometer as defined by claim 1, wherein a crystal is used as the temperature-sensitive piezoelectric element (2).

3. An electronic thermometer as defined by claim 1, wherein a quartz oscillator is used as the temperature-sensitive piezoelectric element (2).

4. An electronic thermometer as defined by claim 1, wherein the housing (3) at least partly consists of a material selected from the group consisting of diamagnetic and paramagnetic material.

5. An electronic thermometer as defined by claim 4, wherein the housing (3) consists essentially of a material selected from the group consisting of ceramic, glass and quartz glass.

6. An electronic thermometer as defined by claim 1, wherein the housing (3) is tubular, the piezoelectric element (2) being located in an end formed as a measuring tip (3'), while the first coil (6) is located in the end (3") remote from the measuring tip.

7. An electronic thermometer as defined by claim 6, wherein the second coil (7) can be slipped onto the end (3") of the housing.

8. An electronic thermometer as defined by claim 1, wherein the first coil (6) has a ferrite core (6').

9. An electronic thermometer as defined by claim 8, wherein the second coil (7) is firmly connected to a permanent magnet (7'), which serves to center the inductive connection of the two coils (6, 7).

10. An electronic thermometer as defined by claim 8, wherein the second coil (7) is firmly connected to an electromagnet, which serves to center the two coils (6, 7).

11. An electronic thermometer as defined by claim 8, wherein the second coil (7) carries a direct-current component and simultaneously serves as an electromagnet.

12. An electronic thermometer having
    a generally cylindrical rotatable sealed housing (3) of electrically insulating material; an oscillator comprising;
    a temperature-sensitive piezoelectric element (2) with a mechanical resonance frequency which is temperature-dependent, located inside said housing (3), said element including a pair of terminals (4,5);
    an oscillator circuit (1), having a pair of oscillator input terminals (8, 9) galvanically separated from said rotatable housing and piezoelectric element, and an output;

evaluation unit means (10) for detecting temperature, connected to said oscillator output;

a first coil (6) located adjacent an outer wall of said rotatable housing (3) and connected across said piezoelectric element terminals (4, 5), and a second coil (7) separated from said rotatable housing (3), but aligned with said first coil (6), and connected across said oscillator input terminals (8,9), said coils (6, 7) transmitting a temperature-dependent signal from said piezoelectric element (2) to said oscillator circuit (1), thus directly specifying the oscillation frequency thereof, while providing said galvanic separation therebetween;

and wherein said first coil (6) is attached over a relatively large surface area over the inside of the housing (3), the field lines extending at right angles to the housing wall and entering into said second coil (7) disposed outside the housing (3).

* * * * *